United States Patent [19]

Dzikewich et al.

[11] Patent Number: 5,706,500
[45] Date of Patent: Jan. 6, 1998

[54] SELECTIVE TRANSACTION ORIENTED RECOVERY AND RESTART FOR MESSAGE-DRIVEN BUSINESS APPLICATIONS

[75] Inventors: Dan Dzikewich, Southampton, United Kingdom; Thomas Gossler, Stuttgart; Frank Kunze, Bietigheim, both of Germany

[73] Assignee: International Business Machines Corporation, Armonk, N.Y.

[21] Appl. No.: 504,869

[22] Filed: Jul. 20, 1995

[30] Foreign Application Priority Data

Jul. 25, 1994 [EP] European Pat. Off. .............. 94111580

[51] Int. Cl.⁶ ................................................ G06F 15/163
[52] U.S. Cl. .................... 395/610; 395/608; 395/610; 395/617; 395/618; 395/200.03; 395/839; 395/182.13
[58] Field of Search ..................... 395/608, 610, 395/618, 201, 617, 200.03, 839, 182.13

[56] References Cited

U.S. PATENT DOCUMENTS

| | | | |
|---|---|---|---|
| 3,662,401 | 5/1972 | Collins et al. | 444/1 |
| 5,025,369 | 6/1991 | Schwartz | 364/200 |
| 5,089,954 | 2/1992 | Rago | 395/600 |
| 5,179,654 | 1/1993 | Richards et al. | 395/406 |
| 5,212,790 | 5/1993 | Ohler et la. | 395/650 |
| 5,278,975 | 1/1994 | Ishata et al. | 395/553 |
| 5,357,632 | 10/1994 | Pian et al. | 395/650 |
| 5,371,886 | 12/1994 | Britton et al. | 395/600 |
| 5,381,545 | 1/1995 | Baker et al. | 395/575 |
| 5,388,214 | 2/1995 | Leiserson et al. | 395/800 |
| 5,465,328 | 11/1995 | Dievendorff et al. | 395/182.13 |
| 5,608,870 | 3/1997 | Valiant | 395/200.1 |

OTHER PUBLICATIONS

Egolf, D.A., "The Analysis of a Commerical Implementation of Multiple 2 Phase Commitment Protocols Within a Single Operating System Integrity Control Layer", 8th Annual Int'l. Phoenix Conf. on Computers and Communications, Mar. 22, 1989, AZ, pp. 497–501.

Dandamudi, S. et al., "Performance of Transaction Scheduling Policies for Parallel Database Systems", Proceedings of the 11th Int'l. Conf. on Distributed Computing Systems, May 20, 1991, TX, pp. 116–124.

Primary Examiner—Thomas G. Black
Assistant Examiner—Jean R. Homere
Attorney, Agent, or Firm—Lawrence D. Cutter

[57] ABSTRACT

A method for processing a business request in a transaction system is disclosed. A state indication indicates the current processing state of the business request within a service processing means for processing the business request. A unit of work is selected from a plurality of units of work for processing sub-requests of the business request dependent on the state indication. The selected unit of work is processed. The current processing state of the business request is stored within the service processing means and then all modifications prepared by the processing is committed.

28 Claims, 3 Drawing Sheets

SELECTIVE TRANSACTION ORIENTED RECOVERY AND RESTART FOR MESSAGE-DRIVEN BUSINESS APPLICATIONS

BACKGROUND OF THE DISCLOSURE

The invention relates to the restartability and step level recovery in message driven transaction environments.

DESCRIPTION OF THE PRIOR ART

In transaction environments of computer systems, application processing is divided into transactions which are further dividable into units of work. The characteristics of the units of work is that, when a unit of work is applied, it will be carried out either completely or not, however not in parts. That means that the event which is to be achieved by the unit of work will either happen or not.

A transaction, which typically is based on a user interaction, can also involve several interactions with resource managers such as database systems or queuing systems. For example, a transaction of transferring money from one account to another will be started by a user interaction of a bank employee. All resource modifications, such as updating a row in a relational database, must be completed before these changes are committed in order to prevent irregularities and failures. In the case that a failure happens during the processing of a transaction, all changes must be backed out or rolled back, that is to undo the changes within the uncompleted unit of work. A transaction manager, together with the involved resource managers, has to take care of the integrity of the used resources within the transaction.

In message driven transaction environments, the communication with the user interface and/or other application processes is based on messages which are put into queues. A message can be considered as a business request (or reply) sent from one client process to a server process, or vice versa. Such a business request could be in the above example of transferring money the request from the bank employee "transfer the amount of money M from account A to account B".

The message driven processing enhances the transaction environment by two main features. The first feature is the capability for distributed processing in a heterogeneous system. In the above example this means that the transaction which handles the updating of account A may be located remotely in another computer system. The second feature is the capability for an event driven processing, that means that the processes are started when a message or business request is received (e.g. the transactions which handles the updating of account A is started when a message arrives in a particular queue on the remote system). For the distributed processing the message flows may also be synchronized with the traditional resource updates, such as updating a table in a relational database, as known in the prior art.

Some complex business applications require even several units of work within one transaction to fulfil the required business request. Assumed that in the above example the database for account A is remotely located whereas the database for account B is local, the units of work (UOW) could be:

UOW 1: send a message to the remote system to debit the amount of money M from account A;

UOW 2: wait for a completion message from the debit process of UOW 1 and credit the amount of money M to account B.

In this example, two units of work are required since the message to the remote system of UOW 1 can first be sent when UOW 1 is completed. Therefore, the completion message from the remote system cannot be received within UOW 1.

In case of a failure happening during the processing (e.g. a power failure or a software problem), the transaction environment guarantees the consistence of the message flows and the resource updates within each individual unit of work. However, there is no synchronization done on the context level of the required transaction, that means comprehensively for all units of work applied within the transaction. The context level of a transaction provides the essential data required for the transaction (like account numbers A and B and the amount of money M to be transferred) and state information (which units of work have been completed successfully and which units of work have not yet been processed).

The result of the missing synchronization on the context level is that the context data are lost. Restarting these transactions from the beginning in the case of an error occurring during the processing of the transaction may result in a duplication of the already completed units of work (e.g. the amount of money M is debited or credited twice) and would require complex and performance consuming inquires before the actual processing can be performed.

SUMMARY OF THE INVENTION

It is therefore an object of the invention to provide a transaction system which allows a reliable and safe restartability of the system.

The invention allows message driven business transactions, which are also called scripts, to manage multiple units of work within one transaction. The script can concentrate on the business logic (e.g. what has to be done for the money transfer only), while a business event processor takes care of integrity and restartability on the application context level. This leads to a tremendous reduction of application complexity and an important success factor for developing complex business applications in a productive and efficient way.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
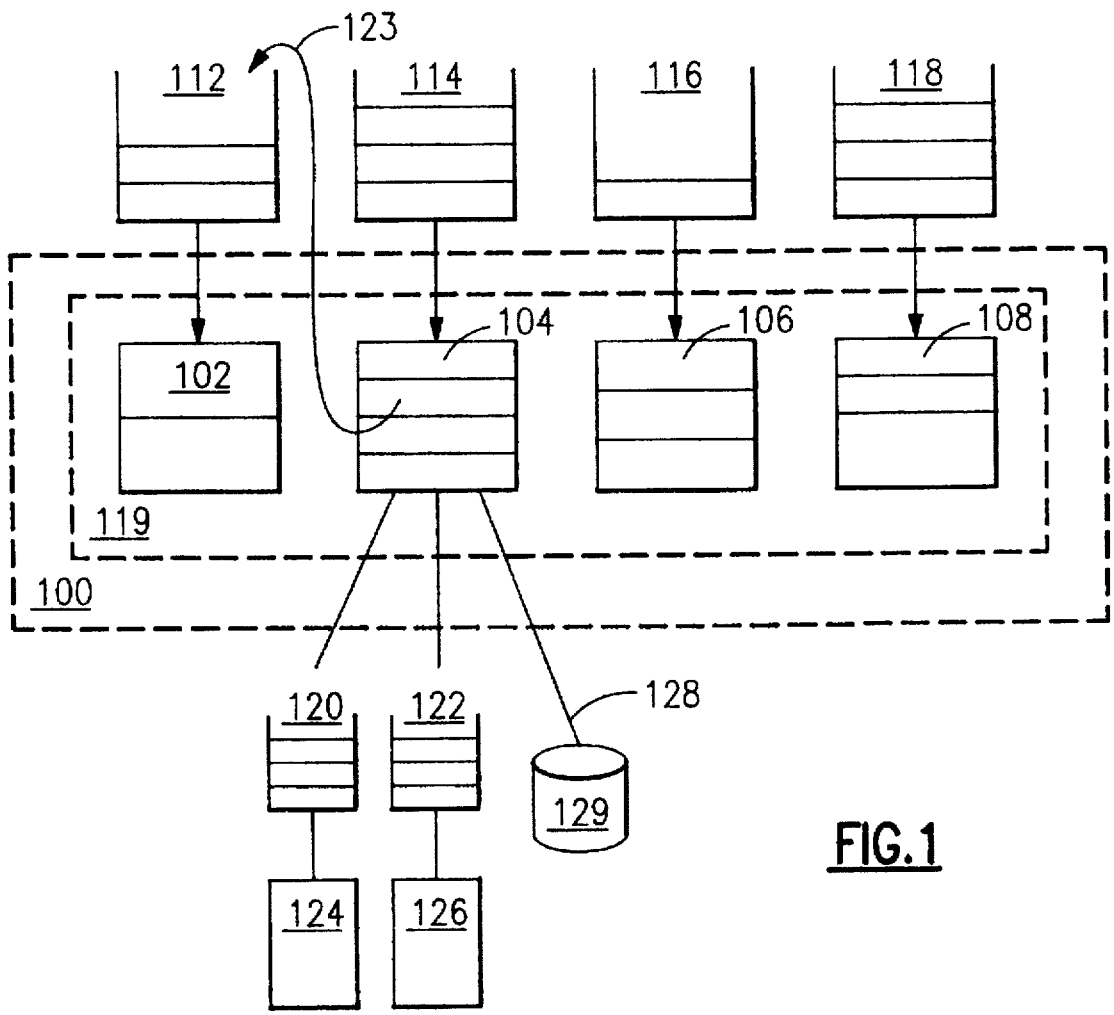
FIG. 1 shows a message driven business transaction environment.

FIG. 1 shows a message driven business transaction environment. A business event processor 100 provides the runtime environment for message driven business transactions, the so called scripts 102–108. These scripts 102–108 define how business requests 112–118 (e.g. messages in queues) have to be processed in the transactional environment. The business event processor 100 is therefore considered as an extension of a transaction manager 119 as known in the prior art in order to process the scripts 102–108 according to the invention.

Dependent on the business requests 112–118, the scripts 102–108 may decompose or recompose the business requests 112–118 into multiple secondary business requests 120–122 in order to process sub-steps of the initial business request. It is to be understood that those secondary business requests can be any kind of business requests 123 within the business event processor 100 or so-called back-ends 120–122 which are outside of the business event processor 100. The secondary business requests 120–123 are further processed by scripts 124–126 and 102 which can be part (102) of or outside (124–126) the business event processor 100. When the business requests 112–118 or parts of them can be executed without being decomposed into secondary business requests 120–124, a traditional resource manager call 128 to a resource manager 129 (e.g. a database) may be issued immediately.

Figure 2:
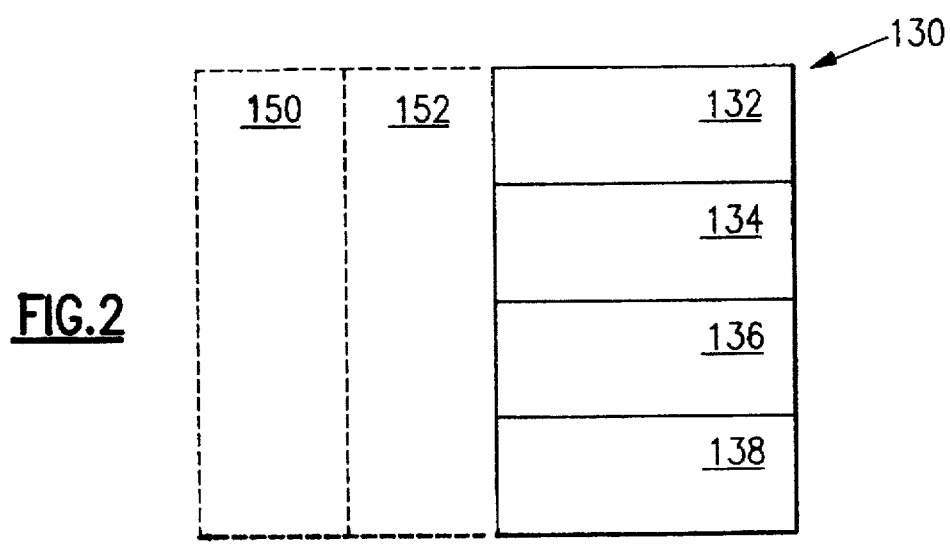
FIG. 2 shows a step level recovery script 130 according to the invention which enables to recover the processing subsequent to the last completed unit of work.

FIG. 2 shows a step level recovery script 130 according to the invention which enables one to recover processing subsequent to the previous completed unit of work. The step level recovery script 130 consists of several atomic units of work (UOW) 132–138. All of the resource manager calls and the required message flows within a single unit of work 132–138 are performed under commitment control by the business event processor 100 via functions provided by the transaction environment and the queuing system. The step level recovery script 130 is started under the control of the business event processor 100 and interfaces with server or back-end processes (e.g. a remote transaction performing the actual database update) via interfaces to exchange messages provided by the business event processor 100.

The interface to the traditional resource managers (e.g. database 129) is achieved via interfaces to update or manipulate recoverable resources (e.g. a row in the database 129) provided by these resource managers 129. The transaction environment provides an integrated commitment control facility which includes message flows and resource manager calls within each unit of work 132–138. The transaction manager 119 together with the resource managers (e.g. database 129) prepare all message flows and resource updates during the processing of each unit of work. At the end of the processing of the respective unit of work, those prepared message flows and resource updates are eventually executed when the respective script of the unit of work issues a commit signal for this unit of work to the business event processor 100. If no commit signal is issued or a roll-back signal (in order to undo the changes) appears, all previous message and resource updates will not be processed or executed.

The business event processor 100 according to the invention provides facilities to further include an application context 150 and a script processing state 152 as part of the units of work 132–138. The application context 150 contains the essential data required for the entire transaction (e.g. in the above example of transferring money from account A to B, the account numbers A and B and the amount of money M to be transferred) or other application data that can be stored in a main storage. The script processing state indicates 152 which units of work have already been processed (e.g. the message to debit the account A has been sent).

The provision of the application context 150 and the script processing state allows the step level recovery script 130 to be easily restarted after a failure from the last recently processing unit of work 132–138 without an unwanted duplication of messages flows or duplicated resource manager interactions (e.g. the amount of money M will not be debited or credited twice).

Figure 3A:
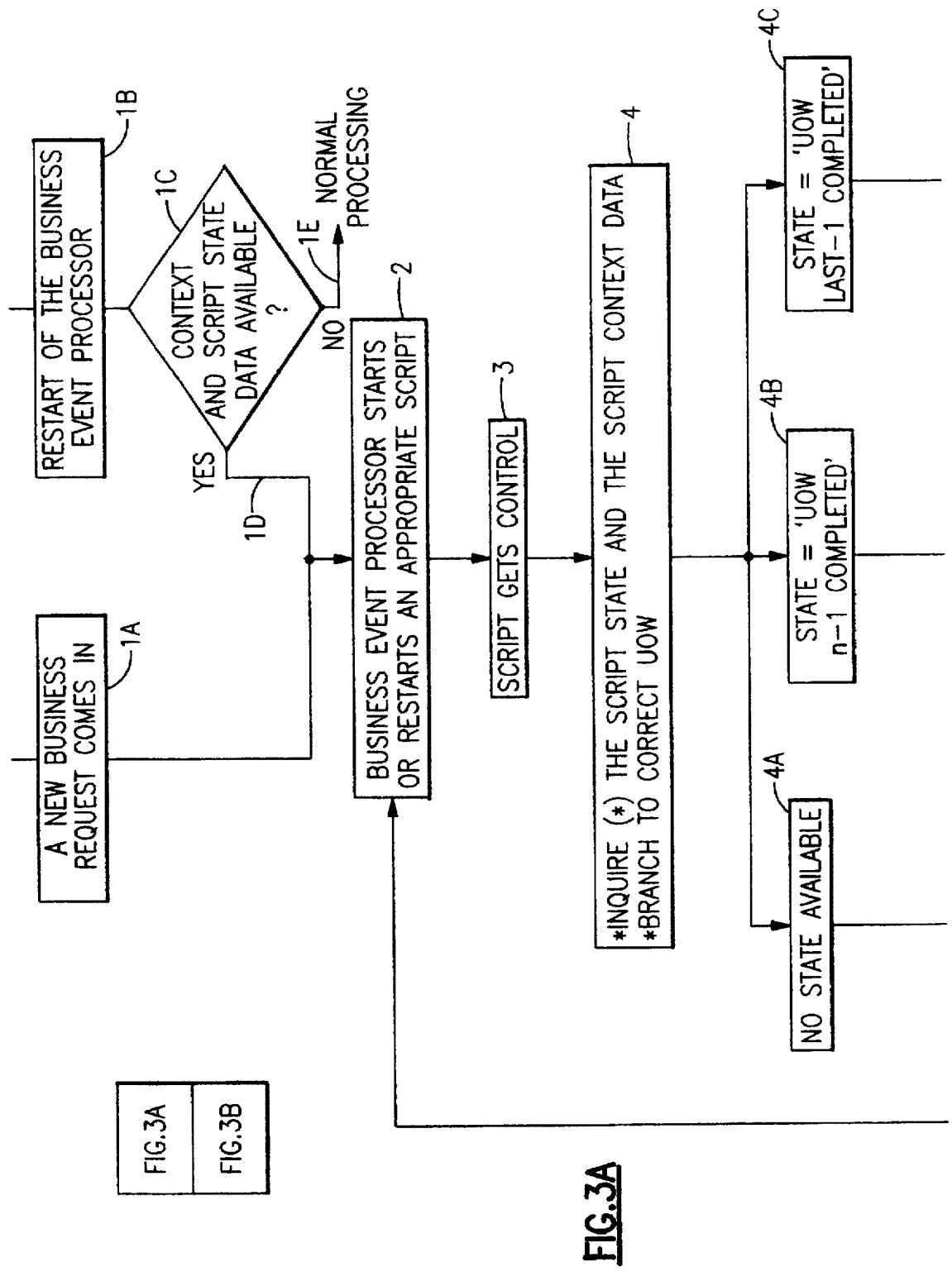
FIG. 3 shows the script processing logic using the step level recovery according to the invention.
Figure 3B:
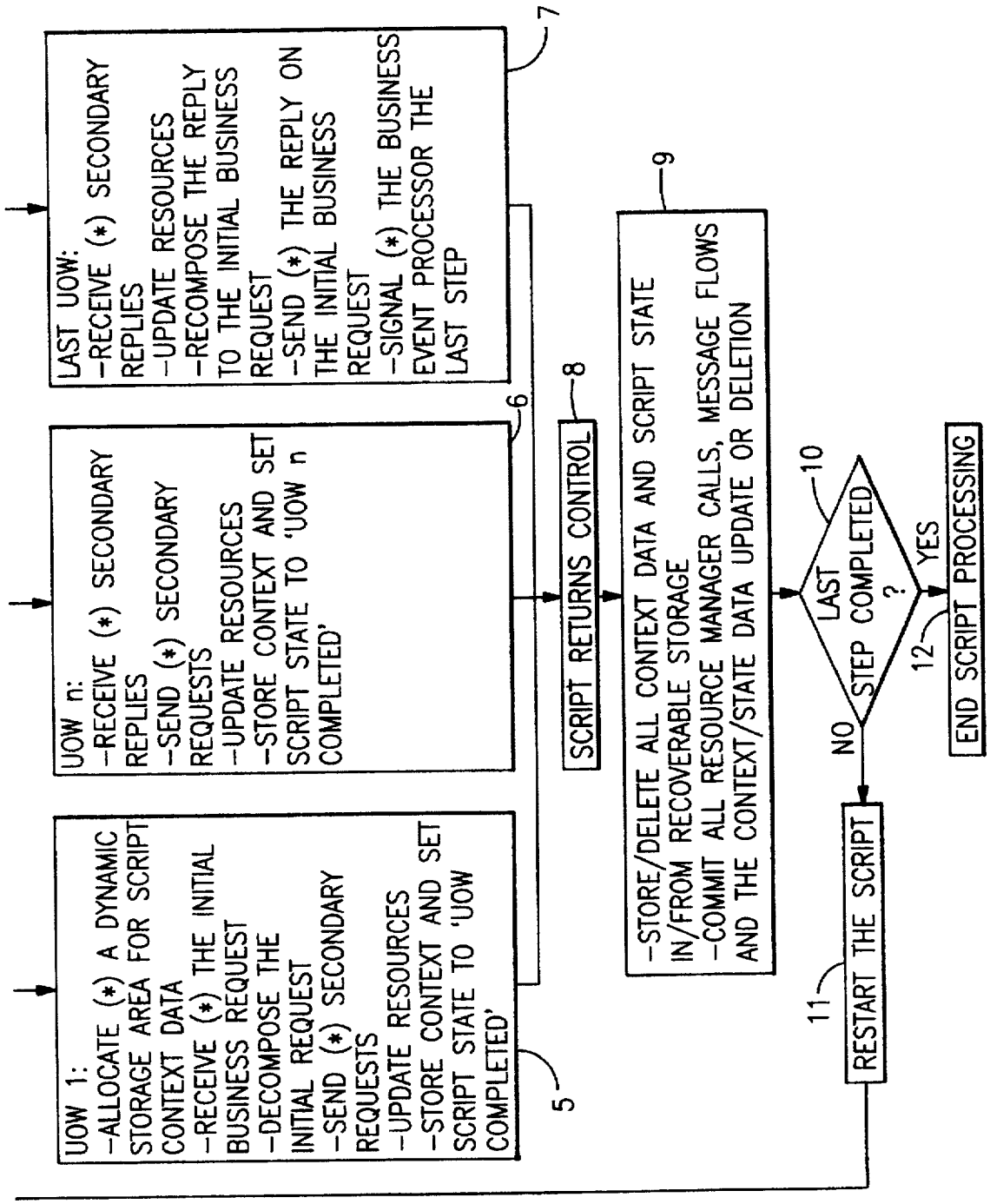

FIG. 3 shows the script processing logic using the step level recovery according to the invention. During a normal processing flow, a new business request (e.g. "transfer the amount of money M from account A to account B") comes into the transaction system in a step 1a. Referring back to FIG. 1, the business request will be put in either one of the queues which are processed by the business event processor 100. When the transaction system has been restarted (step 1b) after a system failure, the business event processor 100 checks in a step 1c, if the data of the application context 150 (e.g. account numbers A and B and amount of money M) and the script processing states (which ones of the units of work have already been processed) are available in the restart data sets. If these data sets are available (1d), the business event processor 100 rebuilds the application context 150 and the processing state 152 for the script to be restarted. If these data sets are not available (1e), all previously running scripts have been completed successfully.

In a step 2, subsequent to step 1a or step 1d, the business event processor 100 starts or restarts, determined by the business request, the appropriate script 130 which comprises the information how this business request is to be processed. In a next step 3, control is transferred from the business event processor 100 to the script 130. That means that the script 130 is a dynamic subroutine of the business event processor 100.

In a step 4 successive to step 3, the script 130 inquires via a programming interfaces provided by the business event processor 100 the current script processing state 152 and the current application context 150 from the business event processor 100. Dependent on the current script processing state 4a, 4b or 4c and the data of the application context 150, the script 130 branches to either one of the next processing steps 5, 6 or 7.

When the script 130 is started for the first time, no state information (4a) about previously completed units of work and application context 150 is available. The first processing unit of work 132 will then be processed in step 5 which comprises:

step 5a: allocating, via provided programming interfaces by the business event processor 100, a dynamic main storage area for the application context 150 and start processing the first unit of work 132;

step 5b: receiving the initial business request via provided programming interfaces by the business event processor 100;

step 5c: decomposing the initial business request, that is extracting data which is relevant for certain units of work (e.g. the debiting process) only;

step 5d: sending via provided programming interfaces secondary requests to back-ends or other servers (secondary message flows); and/or step 5e: updating resources via resource manager calls (e.g. performing the crediting process by updating a local database);

step 5f: storing the application context 150 in the assigned area and setting the script state to 'Unit of work 1 completed'.

When the script state (4b) is 'Unit of work n−1 completed', this means that all n−1 processing units of work 132–138 have been completed and committed successfully.

The unit of work n must be the next unit of work to be processed in step 6 which comprises:

步 step 6a: receiving replies (e.g. the confirmation from the remote debiting process), via provided programming interfaces, which correspond to the secondary requests sent in the previous units of work;

step 6b: sending additional message flows (secondary requests) to back-end or other servers; and/or step 6c: updating resources by issuing resource manager calls;

step 6d: storing the application context 150 in the assigned area and setting the script state to 'Unit of work n completed'.

When the script state (4c) is 'Unit of work Last-1 completed', this means that all Last-1 processing units of works 132–136 have been completed and committed successfully. Unit of work 138 is then the last unit of work within this script 130 to be processed. Processing the last unit of work 138 is done in step 7 which comprises:

step 7a: receiving replies, via provided programming interfaces, which correspond to secondary requests sent in previous units of work and/or issue resource manager calls;

step 7b: updating resources by issuing resource manager calls;

step 7c: recomposing a reply to the initial business request (e.g. combining data, received from secondary replies of secondary requests, into a single reply for the initial request);

step 7d: sending the reply to the sender (client) of the initial business request;

step 7e: signalling to the business event processor 100, via provided programming interfaces, that this is the last processing unit of work 138.

Subsequent to either one of the steps 5, 6 or 7, the script 130 returns control to the business event processor 100 in a step 8.

In a next step 9, the business event processor 100 stores (or deletes in case of the last processing unit of work 138) the application context 150 and the script processing state 152 into (or from) a recoverable storage which is also included in the integrated commitment control facilities of the transaction environment. The business event processor 100 issues a COMMIT signal to make all changes or deletions permanent. Before the COMMIT signal has been issued all modifications initiated by the respective script are only prepared but not executed. The resource updates are done, the message flows are sent out and the application context 150 and state data are stored or deleted within this unit of work.

If a system failure occurs before this step 9, resource changes, state changes, and message flows are rolled back automatically by the transaction environment. This allows, after a restart of the business event processor 100, the automatically restarted script 130 to use the most recent state data and to continue with the next un-committed unit of work 132–138 and to skip the already completed units of work.

In a next step 10, the business event processor 100 checks if there are more units of works 132–138 to be processed. If there are more units of work 132–138 to be processed, the business event processor 100 restarts in a step 11 the script 130 to the beginning, that is step 2. However, it is not necessary for the script 130 to distinguish between a restart immediately after the completion of the last unit of work or a restart due to 5 a system failure. If this restart follows immediately after the last processed unit of work 132–138 or after a restart due to a system failure.

If there are no more units of work 132–138 left to be processed, the business event processor 100 ends the processing of this script 130 in a step 12 and waits for the next business request to be processed.

Upon a reading of the present disclosure, it will be apparent to the skilled artisan that other embodiments of the present invention beyond those embodiments specifically described herein may be made or practiced without departing from the spirit of the invention. It will also be clear to the skilled artisan that numerous equivalent elements may be substituted for elements expressly disclosed herein as a part of a functional limitation described or claimed in means-for terms. Similarly, changes, combinations and modifications of the presently disclosed embodiments will also become apparent. The embodiments disclosed and the details thereof are intended to teach the practice of the invention and are intended to be illustrative and not limiting. Accordingly, such apparent but undisclosed changes, combinations, and modifications are considered to be within the spirit and scope of the present invention.

What is claimed is:

1. A transaction system comprising:
    at least one service processing means for processing a definable business request, said at least one service processing means including:
        a plurality of units of work for processing sub-requests of said business request, wherein said processing provided by each respective unit of work is subject to a partial completion condition;
        a state indication means providing current processing status for said business request within said service processing means;
        a processing control means for controlling the processing of the service processing means by selection of one of said plurality of units of work; and
        a context means which provides context information required for processing said business request upon said partial completion condition.

2. A method for processing a business request in a transaction system, said method comprising the steps of:
    requesting status information indicating current processing status for said business request within a service processing means for processing said business request;
    selecting a unit of work from a plurality of units of work for processing sub-requests of said business request dependent on said status information;
    processing said selected unit of work so that modifications caused by said business request are made ready for committal within other service processing means;
    storing current processing status information for said business request within said service processing means; and
    committing within said other service processor means all of said modifications made ready in said above processing step.

3. The method according to claim 2 further comprising a step, preceding said requesting step, of allocating control from a processing control means for controlling the processing of the service processing means, to at least one service processing means for processing said business request.

4. The method according to claim 2 further comprising a step, preceding said selecting step, of requesting context information required for processing of a respective unit of work using said context information for said respective business request.

5. The method according to claim 3 further comprising a step, preceding said selecting step, of requesting context information required for processing of a respective unit of work using said context information for said respective business request.

6. The method according to claim 4 wherein said storing step comprises a step of storing said context information.

7. The method according to claim 2 further comprising a step, preceding said committing step, of reallocating control from said at least one service processing means, to a process control means.

8. The method according to claim 3 further comprising a step, preceding said committing step, of reallocating control from said at least one service processing means, to a process control means.

9. The method according to claim 4 further comprising a step, preceding said committing step, of reallocating control from said at least one service processing means, to a process control means.

10. The method according to claim 6 further comprising a step, preceding said committing step, of reallocating control from said at least one service processing means, to a process control means.

11. The method according to claim 2 further comprising a step of decomposing said business request into a plurality of sub-requests and another step of recomposing results obtained from the processing of said sub-requests to produce a result for said business request.

12. The method according to claim 3 further comprising a step of decomposing said business request into a plurality of sub-requests and another step of recomposing results obtained from the processing of said sub-requests to produce a result for said business request.

13. The method according to claim 4 further comprising a step of decomposing said business request into a plurality of sub-requests and another step of recomposing results obtained from the processing of said sub-requests to produce a result for said business request.

14. The method according to claim 6 further comprising a step of decomposing said business request into a plurality of sub-requests and another step of recomposing results obtained from the processing of said sub-requests to produce a result for said business request.

15. The method according to claim 7 further comprising a step of decomposing said business request into a plurality of sub-requests and another step of recomposing results obtained from the processing of said sub-requests to produce a result for said business request.

16. The method according to claim 2 wherein said processing step further comprises sending and/or receiving secondary business requests to/from other service processing means.

17. The method according to claim 3 wherein said processing step further comprises sending and/or receiving secondary business requests to/from other service processing means.

18. The method according to claim 4 wherein said processing step further comprises sending and/or receiving secondary business requests to/from other service processing means.

19. The method according to claim 6 wherein said processing step further comprises sending and/or receiving secondary business requests to/from other service processing means.

20. The method according to claim 7 wherein said processing step further comprises sending and/or receiving secondary business requests to/from other service processing means.

21. The method according to claim 11 wherein said processing step further comprises sending and/or receiving secondary business requests to/from other service processing means.

22. The method according to claim 2 wherein all modifications prepared in said processing step are first executed after said committing step.

23. The method according to claim 3 wherein all modifications prepared in said processing step are first executed after said committing step.

24. The method according to claim 4 wherein all modifications prepared in said processing step are first executed after said committing step.

25. The method according to claim 6 wherein all modifications prepared in said processing step are first executed after said committing step.

26. The method according to claim 7 wherein all modifications prepared in said processing step are first executed after said committing step.

27. The method according to claim 11 wherein all modifications prepared in said processing step are first executed after said committing step.

28. The method according to claim 16 wherein all modifications prepared in said processing step are first executed after said committing step.

* * * * *